United States Patent [19]

Schmitt

[11] Patent Number: 5,067,777

[45] Date of Patent: Nov. 26, 1991

[54] AIR BRAKE SYSTEM FOR AN ARTICULATED RAILROAD CAR

[75] Inventor: Eugene W. Schmitt, Lockport, Ill.

[73] Assignee: Sloan Valve Company, Franklin Park, Ill.

[21] Appl. No.: 522,806

[22] Filed: May 14, 1990

[51] Int. Cl.[5] .................................................. B60T 8/30
[52] U.S. Cl. .................................. 303/22.6; 303/22.7
[58] Field of Search .................. 303/22.1, 22.2, 22.6, 303/22.7, 22.8, 81, 86

[56] References Cited

U.S. PATENT DOCUMENTS

| | | | |
|---|---|---|---|
| 3,944,294 | 3/1976 | Masuda et al. | 303/9.66 X |
| 4,037,879 | 7/1977 | Horowitz | 303/22.2 |
| 4,093,316 | 6/1978 | Reinecke | 303/22.1 |
| 4,417,767 | 11/1983 | Billeter | 303/22.2 |
| 4,583,790 | 4/1986 | Scott | 303/22.2 |
| 4,624,506 | 11/1986 | Doto | 303/22.8 X |
| 4,648,661 | 3/1987 | Schmitt et al. | 303/22.2 |
| 4,824,179 | 4/1989 | Rees | 303/22.7 |

Primary Examiner—Robert J. Oberleitner
Assistant Examiner—Alfred Muratori
Attorney, Agent, or Firm—Kinzer, Plyer, Dorn, McEachran & Jambor

[57] ABSTRACT

A railroad air brake system for use on an articulated railroad car having a plurality of platforms and trucks supporting the platforms, has separate air brake subsystems for the trucks supporting the end platforms and an intermediate platform. The subsystem for the intermediate platform includes a control valve connected to the train air supply; an air actuating means for each truck supporting the intermediate platform; a sensor valve having a load sensing arm for each truck supporting the intermediate platform, which sensor valves are commonly connected in parallel to both air actuating means; a proportional valve having an input connected to the control valve and an output commonly connected to both air actuating means and both sensor valves; and a volume reservoir connected the sensor valves and the proportional valve. The application of brake pressure from the control valve to the proportional valve, with an empty load condition at either intermediate platform truck causes the sensor valve associated therewith to cause the proportional valve to reduce the air pressure supplied therefrom to the air actuating means for both trucks supporting the intermediate platform.

5 Claims, 2 Drawing Sheets

AIR BRAKE SYSTEM FOR AN ARTICULATED RAILROAD CAR

SUMMARY OF THE INVENTION

The present invention relates to railroad air brake systems for articulated railroad cars and is specifically directed to a subsystem for an intermediate platform of such a railroad car.

A primary purpose of the invention is a railroad air brake subsystem for the intermediate platform of an articulated car in which an empty load condition sensed at either truck supporting the intermediate platform will proportionally reduce the air pressure supplied to the air cylinders for each truck supporting the platform.

Other purposes shall appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENTS

Articulated railroad cars, particularly for use in hauling container freight customarily have a plurality of platforms, for example five, with there being a single truck between adjoining platforms and a truck supporting the outboard end of each of the end platforms. Conventionally the air brake systems for such cars include a plurality of subsystems, there being one subsystem for the trucks supporting each end platform and a subsystem for the trucks supporting the intermediate or middle platform. It is necessary to have subsystems because not all of the platforms in such an articulated car will be equally loaded and it is highly desirable that the brake pressure applied to the trucks supporting each platform be consistent with the load on the platform. U.S. Pat. No. 4,648,661, assigned to the assignee of the present application shows such an air brake system in which there is an empty and load valve used on each intermediate truck. The brake system is divided into three subsystems, one for each end platform and one for the middle platform.

U.S. Pat. No. 4,417,767, also assigned to the assignee of the present application, shows an air brake system for use with a single truck of a railroad car, which system includes a control valve; an auxiliary reservoir; a proportional valve; a sensor valve and load sensing arm; and a volume reservoir. This system senses the load on the truck by the sensing arm of the sensor valve and through the connection between the sensor valve and the proportional valve supplies an air pressure to the air cylinder consistent with the load on the truck. The present invention utilizes a system similar to that of the '767 patent, but uses a single control valve, proportional valve, and volume reservoir in combination with a pair of sensor valves to uniformly control the application of pressure to both trucks of the intermediate or middle platform of an articulated railroad car.

U.S. Pat. No. 4,583,790 shows an empty/load brake control system using a pair of series connected sensor valves with a proportioning valve in which both sensor valves must sense an empty condition to pilot the proportioning valve. In the '790 patent the series connected sensor valves are mounted on opposite sides of the car to overcome the effect of car rocking. In the present invention either sensor valve will cause the proportioning valve to reduce the applied air pressure.

Figure 1:
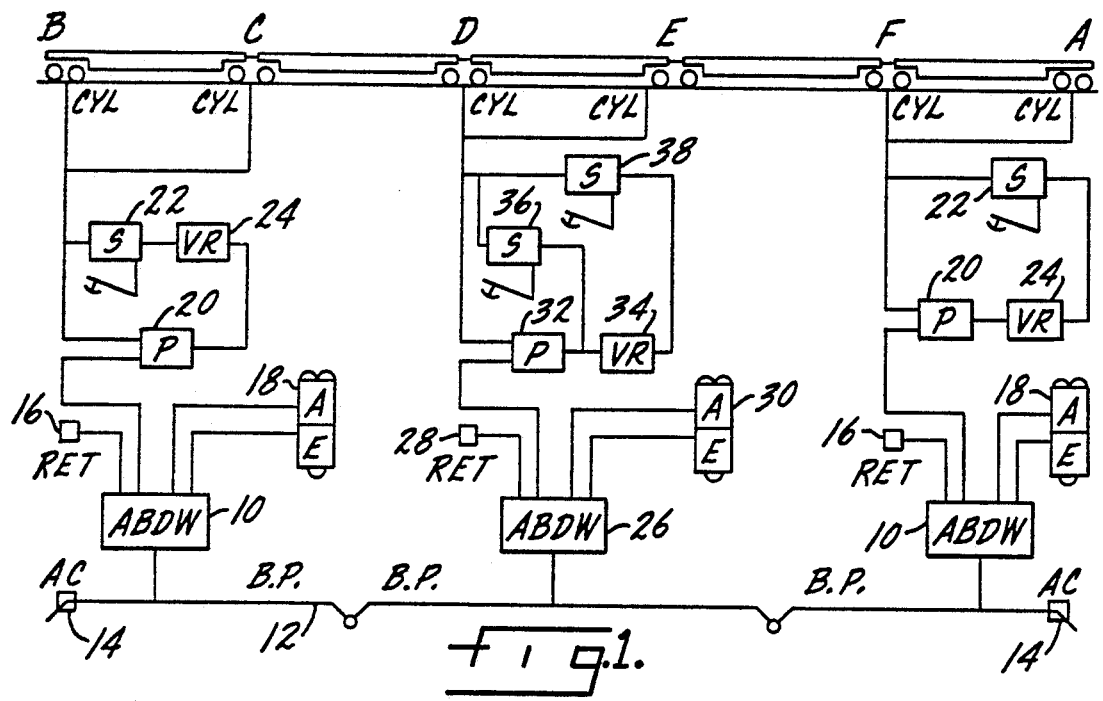
FIG. 1 is a schematic of the air brake system disclosed herein as applied to an articulated railroad car.

In FIG. 1 the five platforms of an articulated railroad car are supported by trucks designated as A through F. The air brake subsystems supporting platforms B-C and F-A are identical and have been used by the assignee of the present application for more than a year before the filing date of the present application. Such subsystems each include an ABDW valve 10 connected to brake pipe 12, the opposite ends of which are connected to angle cocks 14. The control valve 10 is connected to a retainer valve 16 and an equalizing reservoir 18 having auxiliary and emergency chambers. The control valve 10 is connected to a proportional valve 20 of the type disclosed in U.S. Pat. No. 4,417,767. The proportional valve has an output connected to a sensor valve 22 which again is disclosed in the '767 patent as is volume reservoir 24. The output of proportional valve 20, as controlled by the sensor valve is connected to the two air cylinders or air actuating means on each of trucks B and C supporting platform B-C. Again the same air brake subsystem is used for trucks A and F supporting platform A-F.

The subsystem for the intermediate or middle platform D-E supported on trucks D and E includes a control valve 26 which is connected to the brake pipe and to a retainer valve 28 and a reservoir 30 again having auxiliary and emergency chambers. Control valve 26 is connected to a proportional valve 32, a volume reservoir 34 and sensor valves 36 and 38, with all of these components being the same as in the subsystems for the end platform trucks. Sensor valve 36 with its associated sensor arm is mounted on truck D and the position of the sensor arm will be determined by the load on truck D. Conventionally the sensor valve is mounted on the platform of the car with the sensor arm being positioned to contact the truck's side frame when the platform is loaded. Thus the arm of sensor valve 36 will be used to determine the load on truck D and the arm of sensor valve 38 will be used to determine the load on truck E. Proportional valve 32 is commonly connected to the air cylinders for both trucks of the platform and to the sensor valves for both trucks of the platform.

Figure 2:
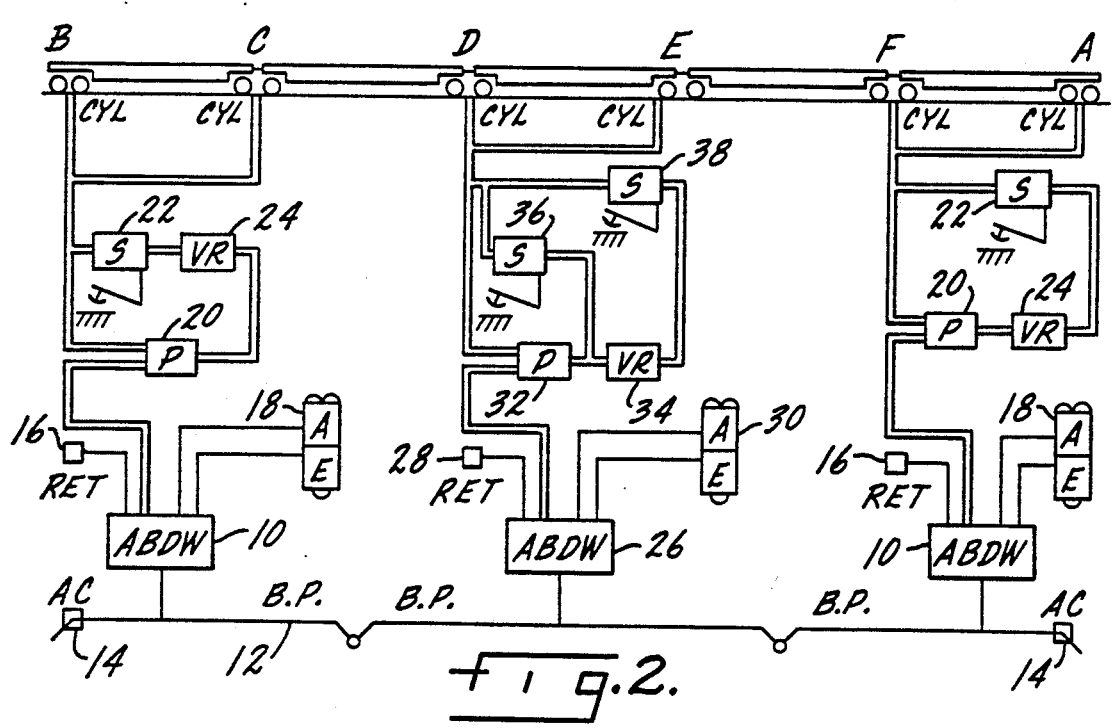
FIG. 2 is a schematic, similar to FIG. 1, showing the application of air pressure when the car is in an empty load condition.

FIG. 2 illustrates the supply of air pressure when all platforms of the articulated car are in an empty load condition. Double lines for a pipe in the air system are used to represent either full or partial air pressure in that particular pipe section.

Considering first the end platforms, control valve 10 supplies full cylinder pressure to proportional valve 20. Since sensor valve 22 indicates a no load condition, that valve will, through volume reservoir 24, provide a counter pressure at another inlet of the proportional valve so that the output from the proportional valve to the two cylinders is at a reduced pressure consistent with the empty load condition of the cars. A more detailed application of this system is disclosed in the '767 patent.

The air brake subsystem for intermediate platform D-E operates in the same manner under empty load conditions. Neither load sensor valve shows a loaded condition and thus partial brake application pressure will be supplied from the proportional valve to the cylinders on both of trucks D and E supporting the intermediate platform.

Figure 3:
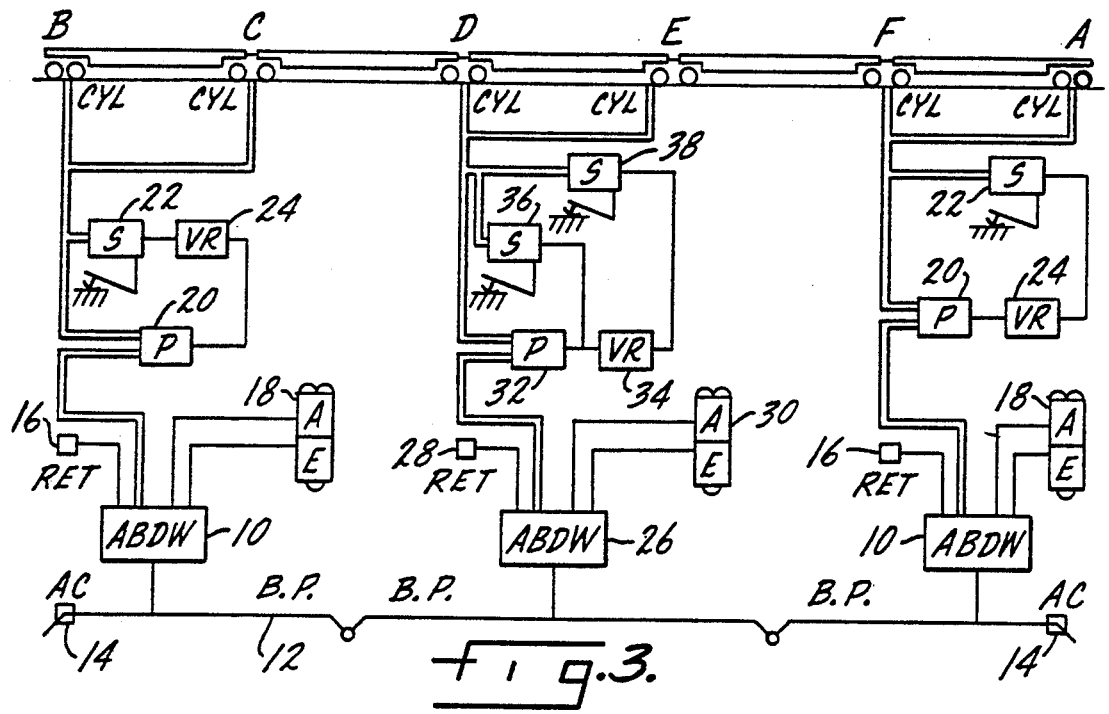
FIG. 3 is a schematic, similar to FIG. 2, but showing the application of air pressure when the car is in a loaded condition.

In FIG. 3 there is a schematic representation of the application of brake pressure when all of the platforms are fully loaded. In this instance the control valves 10 and 26 will supply full pressure to the proportional valves 20 and 32. Since all sensor valves show a fully loaded condition, the sensor valve, volume reservoir combination, will not reduce the air pressure supplied by the proportional valve to any of the air cylinders on the trucks and thus full brake application pressure is supplied to all trucks supporting all of the articulated car platforms.

Figure 4:
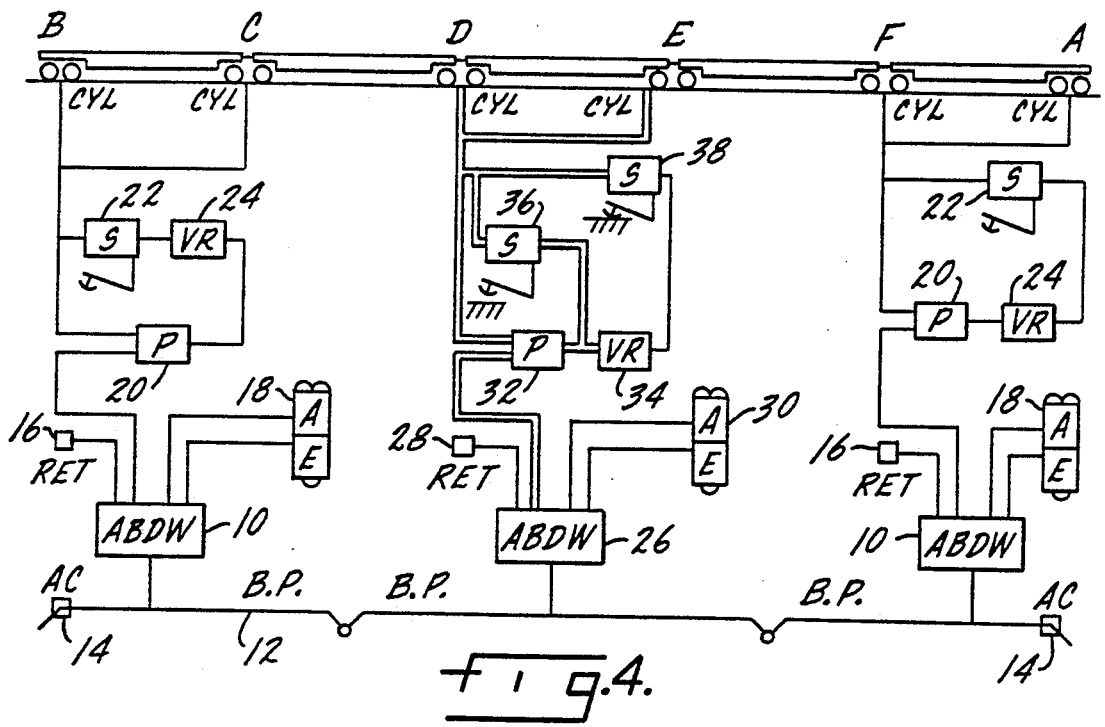
FIG. 4 is a schematic, similar to FIGS. 2 and 3, but showing the intermediate platform of the articulated car in a partially loaded condition.

FIG. 4 illustrates the application of pressure when one of the trucks supporting the intermediate platform D-E is loaded and the other is in an empty load condition. In this instance, truck E is in a loaded condition and truck D is in an empty load condition. The operation would be the same if the loads on the trucks were reversed. Full pressure is supplied by control valve 26 to proportional valve 32. Sensor valve 38, sensing a loaded condition, will not divert a portion of the pressure from the proportional valve output to the volume reservoir and thus back to the proportional valve. However proportional valve 36, whose arm is not in contact with the side frame of truck D, thus indicating an empty load condition will divert a portion of the pressure at the proportional valve output back to the proportional valve input and to the volume reservoir, as described in the '767 patent, so that the output of the proportional valve is, in fact, a reduced brake application pressure. The reduced pressure is applied to the air cylinders for both trucks supporting intermediate platform D-E. The air brake subsystem disclosed herein for the intermediate platform of an articulated railroad car will provide reduced brake operating pressure from the proportional valve if the truck at either end of the platform is in an empty load condition, regardless of whether or not the truck at the other end of the platform is in a fully loaded condition.

In the brake system for an articulated railroad car described in the above mentioned '661 patent, if a platform of the car had a full load on one truck and an empty load condition on the other truck, the load on each truck was individually measured and a corresponding brake pressure was applied thereto. In the present invention, if the trucks of an intermediate platform are differentially loaded, the same reduced brake operating pressure is applied to both trucks. Accordingly, if either truck indicates an empty load condition, empty load brake pressure is applied to the brake cylinders for both trucks. In the prior system of the '661 patent, the sensors, proportional valve and reservoir, as a single unit were mounted at each truck location and were subject to damage caused by truck hunting and vibration. The present system in which the sensor valves are mounted on the car body is less susceptible to this condition. In addition, there is a substantial cost savings realized by eliminating the special combined empty/load valve shown in the '661 patent at each truck.

Whereas the preferred form and several variations of the invention have been shown, described, and suggested, it should be understood that suitable additional modifications, changes, substitutions and alterations may be made without departing from the invention's fundamental theme. It is therefore wished that the invention be unrestricted except as by the appended claims.

The embodiments of the invention in which an exclusive property or privilege is claimed are defined as follows:

1. A railroad air brake system for use on an articulated railroad car having end platforms and an intermediate platform, trucks supporting the platforms and separate air brake subsystems for the trucks supporting the end platforms, the improvement comprising an air brake subsystem for the trucks supporting the intermediate platform which includes:

a control valve connected to a train air supply, an air actuating means for each truck supporting the intermediate platform, each truck supporting the intermediate platform having a sensor valve with a load sensing arm, which sensor valves are commonly connected to said air actuating means, a proportional valve having an input connected to said control valve and an output connected to said air actuating means and said sensor valves, a volume reservoir connected to said sensor valves and to said proportional valve, the application of brake operating pressure from the control valve to said proportional valve, with an empty load condition at any intermediate platform truck causing the sensor valve associated therewith to cause said proportional valve to reduce the air pressure supplied therefrom to said air actuating means.

2. The railroad air brake system of claim 1 further characterized in that said volume reservoir has one connection to one sensor valve, a second connection to a second other sensor valve, with said second sensor valve being connected to the input of said proportional valve.

3. The railroad air brake system of claim 2 further characterized in that said volume reservoir is connected between the outputs of said sensor valves.

4. The railroad air brake system of claim 1 further characterized in that said proportional valve has a common connection to said volume reservoir and one sensor valve, with a second sensor valve being connected to said volume reservoir.

5. The railroad air brake system of claim 1 further characterized in that the separate air brake subsystem for the trucks supporting an end platform includes, a control valve connected to the train air supply, an air actuating means for each truck supporting the end platform, a sensor valve having a load sensing arm for one of the trucks supporting the end platform, which sensor valve is connected to said air actuating means for said end platform trucks, a proportional valve having an input connected to said control valve and an output connected to said sensor valve, a volume reservoir having one connection to said sensor valve and a second connection to said proportional valve, the application of brake operating pressure from said end platform control valve to said end platform proportional valve, with an empty load condition sensed by said sensor valve causing said sensor valve to cause said proportional valve to reduce the air pressure supplied therefrom to said end platform air actuating means.

* * * * *